(12) United States Patent
Weiner

(10) Patent No.: US 6,183,176 B1
(45) Date of Patent: Feb. 6, 2001

(54) PALLET RACKING SYSTEM

(75) Inventor: Marvin H. Weiner, Mt. Airy, MD (US)

(73) Assignee: Cryo-Trans, Inc., Mt. Airy, MD (US)

(*) Notice: Under 35 U.S.C. 154(b), the term of this patent shall be extended for 0 days.

(21) Appl. No.: 09/370,835

(22) Filed: Aug. 9, 1999

Related U.S. Application Data

(60) Provisional application No. 60/108,401, filed on Nov. 13, 1998.

(51) Int. Cl.[7] ........................................ B60P 7/08
(52) U.S. Cl. .......................... 410/32; 410/31; 414/498; 105/375
(58) Field of Search ................... 410/31, 32, 35, 410/24, 26; 105/355, 373, 375; 414/498

(56) References Cited

U.S. PATENT DOCUMENTS

| | | | |
|---|---|---|---|
| 2,256,180 | * | 9/1941 | Torburn . |
| 2,629,338 | * | 2/1953 | Koch ..................................... 410/131 |
| 3,385,459 | * | 5/1968 | Wellman, Jr. ........................ 414/498 |
| 3,667,635 | * | 6/1972 | Hackney ............................... 414/498 |
| 3,871,525 | | 3/1975 | Al-Dabbagh et al. . |
| 4,030,611 | | 6/1977 | Konstant . |
| 4,261,470 | | 4/1981 | Dolan . |
| 4,545,490 | | 10/1985 | Hsiao et al. . |
| 4,545,710 | * | 10/1985 | Hepp ..................................... 410/32 |
| 4,678,091 | | 7/1987 | Konstant et al. . |
| 4,699,280 | | 10/1987 | Hoss . |
| 4,704,876 | * | 11/1987 | Hill . |
| 4,712,695 | | 12/1987 | Cheng . |
| 4,759,294 | | 7/1988 | Schuller et al. . |
| 4,884,935 | * | 12/1989 | Smith et al. ......................... 414/498 |
| 4,978,014 | | 12/1990 | Humitz et al. . |
| 5,011,031 | | 4/1991 | Konstant . |
| 5,377,851 | | 1/1995 | Asano et al. . |
| 5,427,485 | * | 6/1995 | Henderson et al. ................... 410/26 |
| 5,547,333 | * | 8/1996 | Pienaar .............................. 410/24 X |
| 5,603,419 | | 2/1997 | Peterson . |
| 5,692,625 | | 12/1997 | Filipescu et al. . |
| 6,010,285 | * | 1/2000 | Cox et al. ............................. 410/26 |

OTHER PUBLICATIONS

Photographs of Prior Art Warehouse Racking System, 3 figures, 2 pages.

* cited by examiner

Primary Examiner—Stephen T. Gordon
(74) Attorney, Agent, or Firm—Bruce A. Kaser

(57) ABSTRACT

The invention is a drive-in pallet racking system for a large transportation vehicle like a railcar or truck trailer. The racking system includes a plurality of center posts which define two drive-through passageways along the length of the vehicle. Pallet-supporting rails are mounted on each side of the posts. One rail is mounted to the posts and the other is mounted on the sidewall opposite the posts. The rails are spaced apart so that a forklift can drive in between them. However, the spacing is sufficiently narrow so that the rails can support the edges of the pallet without any intermediate support.

1 Claim, 3 Drawing Sheets

PALLET RACKING SYSTEM

The priority filing date of U.S. Provisional Patent Application Ser. No. 60/108,401, filed Nov. 13, 1998, is claimed.

TECHNICAL FIELD

The invention described in this document generally relates to pallet systems for loading railcars and other types of shipping containers.

BACKGROUND INFORMATION

Transportation and labor costs make up a significant part of a food processor's costs. Today's food products are commonly moved long distances by truck or railcar. Forklifts are used to load and unload these vehicles—which enable lifting and moving bulk quantities of food products on pallets—and thereby reduce labor costs. Even so, in some cases, significant labor is still required to load and unload these vehicles.

Because of product density or reasons attributable to the type or strength of the packaging used, some food products cannot be stacked two or more pallets high (i.e., with one pallet sitting directly on top of the pallet below). Refrigerated orange juice is a good example of this type of product. Much of the orange juice currently sold in the United States is packaged as liquid juice in low-strength plastic or paper "milk carton" containers. If pallets of orange juice packaged in this way are stacked on top of each other, the weight of the upper pallet crushes the packaging on the pallet below.

When liquid orange juice is shipped in a railcar, the interior volume of the car is usually filled side-to-side, one row at a time, with loaded pallets. The first pallets (typically two wide) are placed in a row across the cargo floor. Wooden beams are then placed cross-wise above them. The beams are supported at each end by rails that run along the length of the inside of each sidewall. Another upper layer of pallets is then loaded onto the beams—creating a stack of "two by two" pallets. The beams prevent the weight of the upper layer from pressing down on the pallets below. This is repeated four pallets at a time, from opposite ends of the car to the doorway space in the center, until the car is filled from end to end. The doorway space is not double-stacked.

The crossbeam system described above has disadvantages. It makes loading and unloading more labor intensive than in situations where product packaging has sufficient strength to allow pallets to be directly stacked one on top of another. Workers have to put the crossbeams in place gradually as the car is loaded. Likewise, the beams need to be removed gradually as the car is unloaded. During loading and unloading, the workers have to move many of the beams from inside to outside of the car to make room for a forklift. The crossbeam system also requires that a large quantity of beams travel with the car at all times. Wooden beams warp and crack in time or simply become misplaced. The loading process can be delayed if a car does not have an adequate supply of good beams.

There are safety issues with the crossbeam system as well. Lifting and carrying wooden beams can lead to back injuries or other kinds of injuries. In the modern workplace, employees frequently sue employers over accidental workplace injuries.

The invention described here relates to a pallet racking system that I developed for the purpose of eliminating the crossbeam system. While my system was developed as an improvement for use in my cryogenic railcar fleet, as described below, my system will work equally well in other types of railcars or large, transportable shipping containers. This should be self-evident from the following description. Nevertheless, in order to give the development of the invention proper context, it will be helpful to explain why the system was developed for my cryogenic railcar fleet.

Cryogenic railcars have a unique construction that is significantly different from "mechanically" refrigerated railcars. A cryogenic railcar is an insulated railcar that has an overhead ceiling bunker compartment for holding carbon dioxide ($CO_2$) snow. $CO_2$ snow is manufactured directly in the bunker by a manifold structure that extends the length of the bunker. Liquid $CO_2$ is piped into the manifold and sprayed into the bunker ("bunker charging") through a series of orifices. During bunker charging, some of the spray is converted directly into $CO_2$ snow that accumulates in the bunker. The remainder becomes cold $CO_2$ gas.

The floor of the bunker (which is also the ceiling of the railcar's lading compartment) holds the snow as it accumulates. The bunker floor is made of a series of insulated fiberglass panels ("bunker panels"). Each bunker panel has vents that allow $CO_2$ gas to flow from the bunker compartment down into the lading compartment. The car is "precooled" by $CO_2$ gas from the manifold during the bunker charging process. Thereafter, sublimation of the accumulated $CO_2$ snow in the bunker creates an ongoing supply of cold gas that keeps the car's cargo chilled or frozen while in transit. Cryogenic railcars are passive refrigeration systems and need an adequate amount of $CO_2$ snow accumulation in the bunker in order to keep the load chilled or frozen while the car is in transit over a period of many days.

The basic cryogenic design described above is illustrated in U.S. Pat. No. 4,704,876 ("the '876 patent") issued to Ralph Hill on Nov. 10, 1987. The '876 patent is incorporated in this document by reference. My company owns the '876 patent.

Because the temperature of $CO_2$ gas and snow are well below freezing, my cryogenic fleet was originally designed to haul frozen food products. The pallet racking design that is described and claimed here arose from my ongoing efforts to commercialize a cryogenic car that can haul food products at a refrigerated temperature without freezing them. At the present time, I am uncertain if the pallet racking system I have designed contributes to the overall thermodynamic operation of the "refrigerated" version of my cryogenic cars. However, it is certain that my pallet racking system eliminates the above labor, safety, and cost drawbacks associated with stacking certain kinds of food products in railcars and similar transportation vehicles.

Pallet racking systems have been used in warehouses for years. However, it is not feasible to put a system built for a warehouse into a railcar. Railcar's pose different design problems. Warehouse systems are made from steel—the strongest material available. Steel is obviously the material of choice because it is suitable for supporting the heaviest pallet loads.

The maximum loaded weight of a railcar is limited by government regulation and is based on the structural load limits that a railcar can carry on tracks. The same kind of limitations apply to truck traffic on highway surfaces. Therefore, putting a warehouse pallet racking frame into a railcar, or a similar transportation vehicle, is not an obvious expedient for at least two reasons. First, the weight of a steel frame decreases the load carrying capacity of the car and, hence, the amount of product that can be carried. Second, unlike a warehouse, where it may be desirable to have moveable racking systems, it is not possible to simply build an independent frame structure into a railcar by resting the framework on the cargo floor. Like any vehicle, railcars shift as they move along the rails and a racking system that supports a heavy load will be subject to high levels of dynamic force caused by movement of the car—over and above simply supporting the weight of the load. This suggests that the framework should be made of steel and built into or tied to the structural framework of the car. Steel is undesirable for the reason just stated. Building the framework into the car is not something that is easy to do as a retrofit.

My racking system overcomes the drawbacks to the crossbeam system described above. While my system, as described below, was designed for use in my cryogenic railcar fleet, and consequently, is described below in the context of a cryogenic railcar, it is to be understood that the system could be used in other kinds of shipping containers (e.g., mechanical railcars, truck trailers, large Sea-Land containers, etc.). Bearing this in mind, my present intention is to obtain the broadest patent coverage possible for any transportable shipping container.

SUMMARY OF THE INVENTION

My invention is a pallet racking system that enables the easy stacking of pallets two high along most of the length of a cryogenic railcar or other types of cargo vehicles and shipping containers where cargo is stacked on pallets.

Permanent stabilizing beams are installed below the ceiling of a railcar and extend cross-wise from one side of the car to the other, inside the lading compartment. A horizontal ceiling beam extends lengthwise along the center line of the car and is connected to the stabilizing beams. The horizontal beam is supported by a row of vertical center posts that extend from floor to ceiling, along most of the length of the car. Each center post is solidly connected to car frame structure in the floor and to the lengthwise ceiling beam at the top.

The center posts carry pallet load rails on each side. Similar load rails are installed on each side wall of the car. The load rails create two parallel "tracks" for respectively supporting a horizontal column of pallets above a layer of pallets that rest on the floor. Skid plates made from laminated oak, composite materials, or other materials such as UHMW plastic extend along each side of the rails. The skid plates guide and hold the pallets in position as they are stacked in the car. The skid plates are also used on the floor of the car to hold the floor pallets in place there, as well as eliminate damage to the interior wall panels. The interior wall panels are susceptible to damage during the loading and unloading process of the transportable shipping container.

My invention creates a transportable container having a "drive-in" racking system for carrying pallets loaded with goods. As indicated above, the container is a transportation container (e.g., railcar, refrigerated trailer, etc.) and of a size that allows a forklift to be driven into it. The parallel pallet-supporting rails described above are spaced apart a distance that is less than the width of a pallet, but at least wide enough to allow the forklift to be driven between the rails. The spacing allows the forklift to drive in and out lengthwise with lowered forks, for moving a loaded pallet below the rails (for resting pallets on the cargo floor), or with raised forks for resting pallets on the rails. While wide enough to allow passage of the forklift, the spacing between the rails is also narrow enough to support the upper pallets without any intermediate means of support.

The framework that makes up the racking system is made of aluminum. It has now been proven that aluminum rails, posts, and beams can be welded together to make the frame and will have sufficient strength to support heavy weight loads. It is also feasible that variations from welded aluminum can be used. For example, UHMW plastic or even composite materials may be strong enough to use as load supporting rails in lieu of aluminum The above features of my system, and additional details, will become better understood by referring to the following detailed description and the attached drawings.

BRIEF DESCRIPTION OF THE DRAWINGS

In the drawings, like reference numerals refer to like parts throughout the various views, and wherein.

BEST MODE FOR CARRYING OUT THE INVENTION

Figure 1:
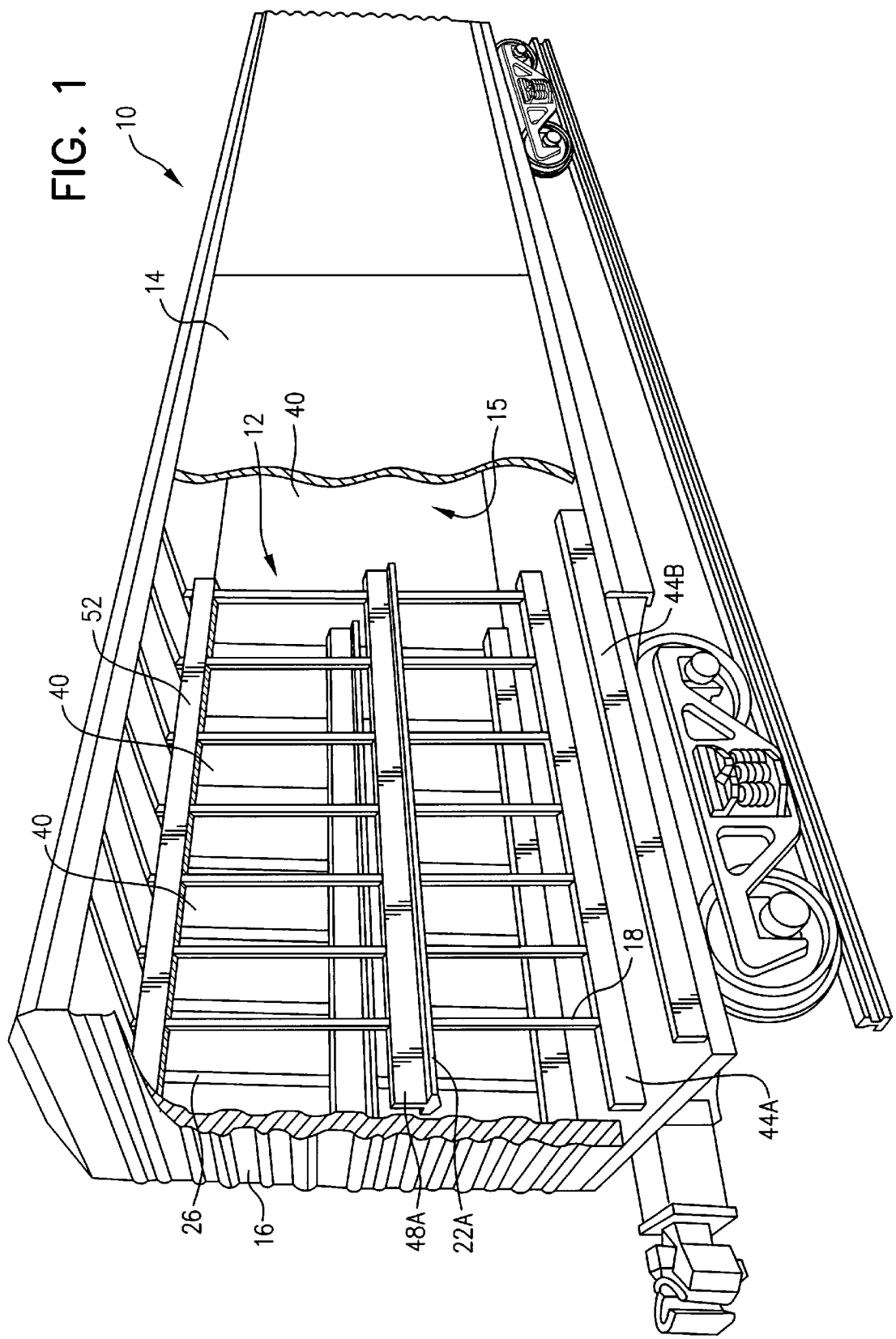
FIG. 1 is a pictorial view of a cryogenic railcar having a pallet racking system constructed in accordance with my invention, and shows the forward end of the railcar cut away and the racking system inside.

A cryogenic railcar 10 is generally illustrated in FIG. 1 of the drawings. Built inside the railcar 10 is a pallet racking system 12 constructed in accordance with the invention. The racking system 12 extends from the car's door 14 to one end 16. A mirror image of what is shown in the forward end of the car is also built into the car's other end. The railcar 10 has a door 14 on each side for loading and offloading products. The racking system 12 does not extend across the doorway space 15.

Figure 2:
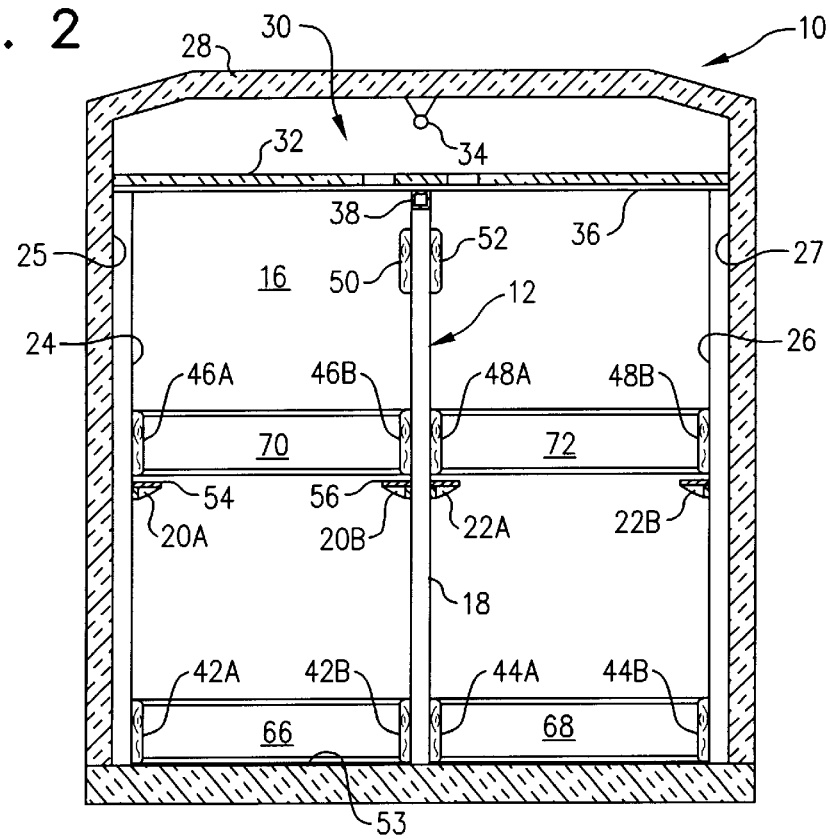
FIG. 2 is a cross-sectional view of the car and racking system shown in FIG. 1.
Figure 3:
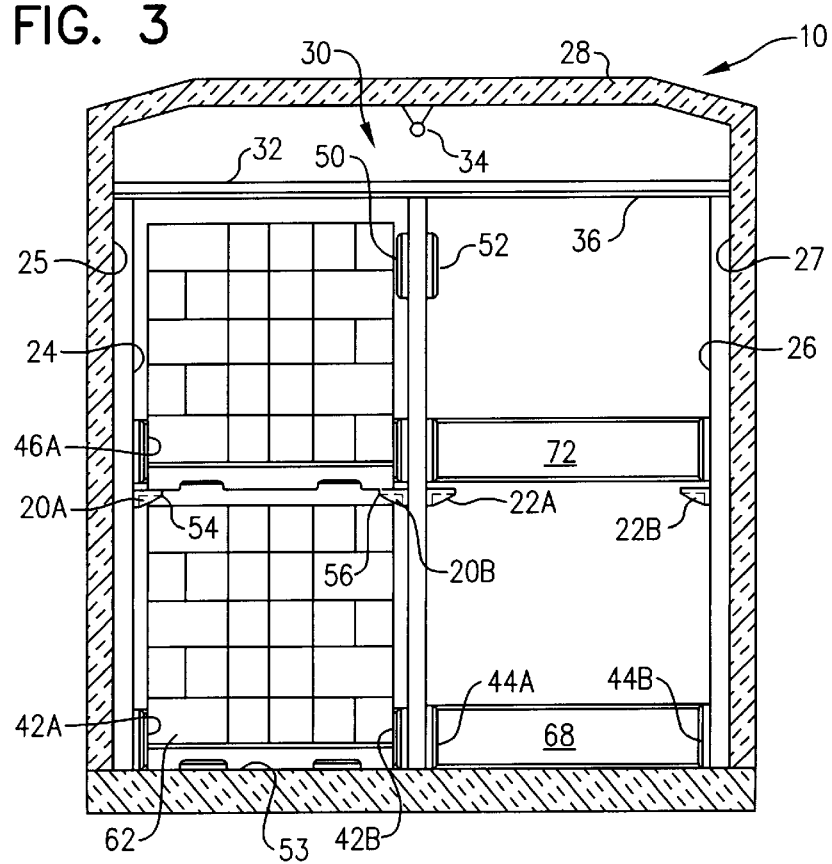
FIG. 3 is a view like FIG. 2 and shows the racking system supporting loaded pallets.
Figure 4:
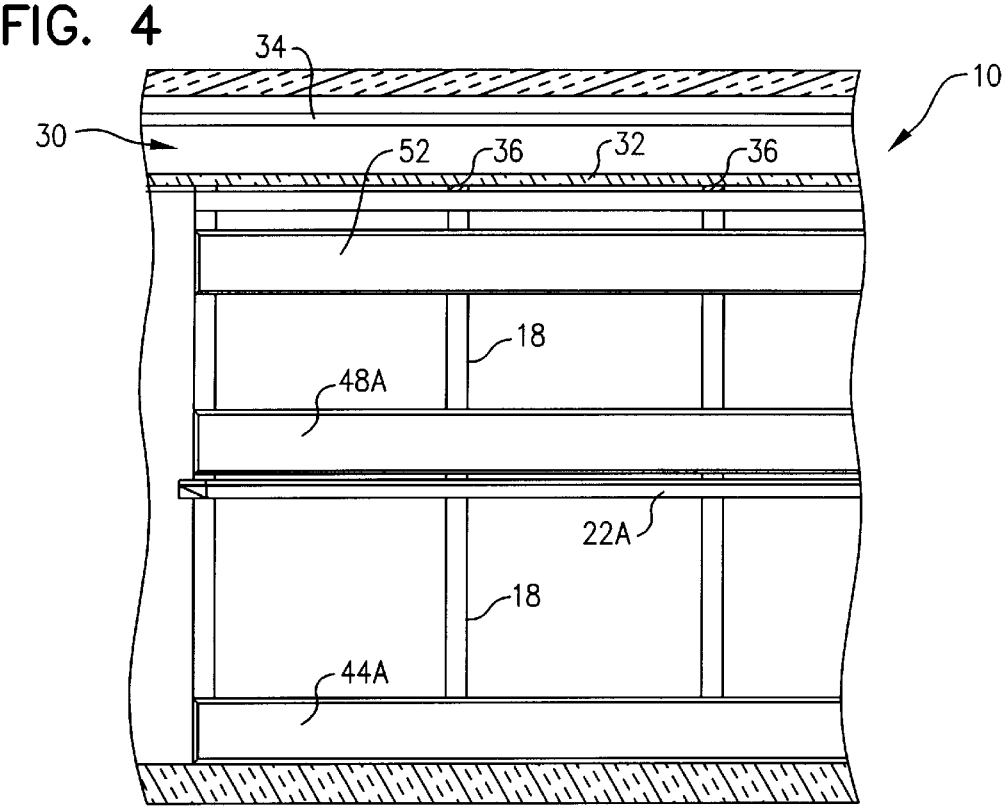
FIG. 4 is a cross-sectional view cut through a portion of the length of the car, from the door toward one end.

Referring now to FIG. 2, the racking system 12 is shown looking end-wise into the car. The racking system 12 has a number of permanent center posts 18 (refer to FIG. 1) that are placed in a row from the doorway space 15 to each end of the car 16, 17. Pallet load rails 20A, 20B, 22A, 22B are respectively mounted to vertical supports 24, 26 on or in each side wall 25, 27 of the car and each side of the center post 18. As will be further described below, the load rails provide supporting surfaces for an upper layer of loaded pallets.

The framework that makes up the racking system 12 is built into the structural framework of the cryogenic railcar 10. The railcar 10 has an insulated shell 28 and an overhead $CO_2$ bunker, indicated at 30. The bunker 30 is separated from the lading area below by fiberglass bunker panels 32. $CO_2$ snow is generated inside the bunker compartment by a manifold that is indicated schematically at 34. For further details concerning the construction and operation of a cryogenic railcar, refer to U.S. Pat. No. 4,704,876, incorporated in this document by reference.

The ceiling bunker panels 32 are normally held in place by rails (not shown) that run along the length of the car. The bunker panels 32 are made of fiberglass and have sufficient strength to hold the weight of the $CO_2$ snow in the bunker 30. However, they cannot provide the structural attachments necessary to stabilize the pallet racking system 12. For this reason, stabilizing beams 36 extend cross-wise below each bunker panel. A lengthwise center beam 38 (see FIG. 1) is connected to the lower surfaces of the stabilizing beams 36 and to the tops of the center posts 18.

The side supports 24, 26 are built into the walls of the car 10. The vertical space from floor to ceiling defined in between each side support 24, 26 is filled with an insulated fiberglass panel. The panel has sinusoidal surfaces that face the cargo area and allow the circulation of cold $CO_2$ gas between the cargo and the walls of the car. The locations of the corrugated panels are shown at 40 in FIG. 1, although the corrugations are not specifically illustrated. They are illustrated in U.S. Pat. No. 4,704,876.

Skid plates 42A, 42B, 44A, 44B, 46A, 46B, 48A, 48B, and 50, 52 are mounted to the side supports 24, 26 and center posts 18. The upper skid plates 46A, 46B, 48A, 48B form guides for loading an upper layer of pallets into the railcar 10. The lower skid plates 42A, 42B, 44A, 44B perform the same function, but for a layer on the cargo floor. There are also skid plates 66, 68, 70, 72 on each end wall. These skid plates create a buffer that protects the end walls against impact by the pallets during loading and transport.

The upper skid plates 46A, 46B, 48A, 48B and pallet rails 20A, 20B, 22A, 22B create two parallel tracks running along the length of the car from the doorway to each end, one track on each side of the center posts 18. The lower skid plates 42A, 42B, 44A, 44B perform the same function but on the floor 53. The skid plates 50, 52 near the bunker panels 32 extend on each side of the center posts 18 near the lengthwise beam 38. In my initial prototype, the skid plates were made from laminated oak. As mentioned above, it may be feasible to use UHMW plastic in lieu of oak. Composite materials may prove to be the best choice and are currently being considered.

While the dimensions may vary from one type of car or container to the next, the center posts 18, side supports 24, 26, and stabilizing beams 36 are spaced approximately 40 inches apart. The pallet load rails 20A, 20B, 22A, 22B should be spaced approximately 60 inches off the floor of the railcar. It is anticipated that the typical pallet of refrigerated orange juice carried by the load rails 20A, 20B, 22A, 22B will weigh approximately 3,000 pounds. It will be approximately 48 inches wide, 55 inches high, and 40 inches deep. The spacing or gap between the innermost edges 54, 56 (see FIG. 2) of the pallet load rails 20A, 20B, 22A, 22B should be approximately 43.5 inches.

Figure 5:
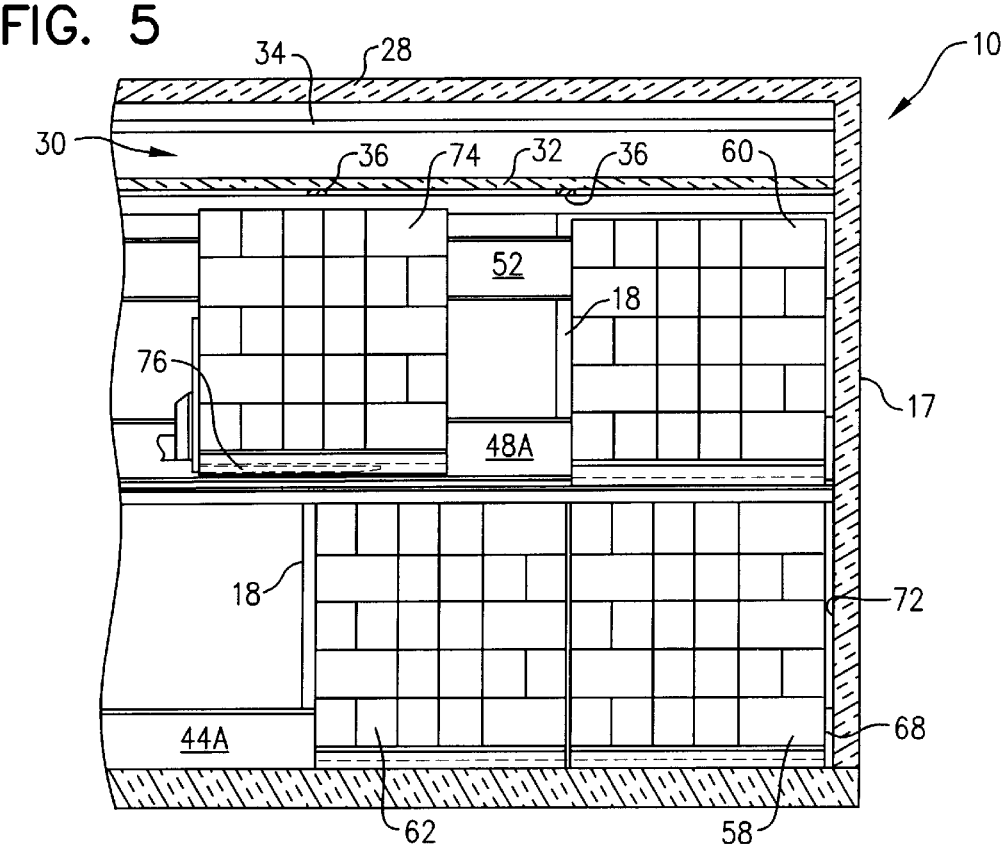
FIG. 5 is a cross sectional view like FIG. 4 but illustrates the loading of pallets in the car.

With the arrangement described above, it is possible for a forklift to drive into the doorway of the railcar 10 and turn into the doorway spaces 15 on one or the other side of the center posts 18. Loading of the car is illustrated in FIG. 5. The forklift driver will place a first pallet on the floor at the far end 17 of the car, as shown at 58. As mentioned above, the end wall skid plate 68 protects the inside of the wall 72 from impact damage. The forklift driver then backs out and returns with raised forks carrying a second pallet 60. In this way, an upper and lower layer of pallets is loaded into the racking system 12, one column at a time, from the end 17 to the doorway space 15. The lower pallet of the next column is shown at 62 in FIG. 5. The upper pallet and the tines of the forklift are shown at 74 and 76, respectively.

There are a unique set of problems associated with building the racking system 12 in the railcar 10. The maximum gross weight of a loaded railcar is limited. The system framework is built from welded aluminum, although some connections and attachments can be made by other means. It is important that the same type of aluminum alloy be used—at least for welding the load rails 20A, 20B, 22A, 22B and side supports 24, 26 and centers posts 18. Poor weld strength will result if different alloys are used. We are investigating the use of UHMW plastic for the load rails 20A, 20B, 20C, 20D in lieu of aluminum. However, we have not yet fully developed alternative materials.

The racking system 12 must have a pallet retention system at the doorway space 15 on each side. As of the current date, I have been considering different ways of closing off the loaded system 12 on each side of the doorway space 15. It is possible that extending nylon webbing cross-wise across the inner most pallets (i.e., the pallets next to the doorway space), can be used to hold the pallets in place. This part of the racking system is still in development and, in any event, is not presently considered to be germane to the invention claimed below.

It goes without saying that the dimensions of the pallet racking system 12 could vary depending on the type of vehicle in which the system is installed. The dimensions described above, therefore, should not necessarily be understood as the optimum dimensions that would be applicable in each and every situation where the system 12 is or could be used.

The development of the racking system 10 into a commercially viable feature of a railcar or the like has never been done before, to my knowledge. While the system 10 is described above in the context of a cryogenic railcar, it is possible that the first commercial version will be built in a mechanical railcar.

In any event, the above description it not meant to be limiting to railcar or shipping container type. Instead, the scope of the invention and the legal rights defined by this document are to be limited only by the patent claim or claims which follow.

What is claimed is:

1. A transportation container having a drive-in racking system for carrying pallets loaded with goods, wherein the container is of a type and size to accommodate a forklift for carrying loaded pallets to and from the container, the drive-in racking system having at least one pair of parallel pallet-supporting rails extending lengthwise relative to the container, the rails being sufficiently long to support more than one pallet, the rails being spaced apart a distance that is less than the normal width of a pallet, for supporting the pallet without any intermediate means of support, but at least wide enough to allow the forklift to be driven in between the rails, the rails being positioned a sufficient distance above the floor of the container to allow the fork lift to move a loaded pallet below the rails on lowered forks, and further, the rails being positioned a sufficient distance below the ceiling of the container to allow the fork lift to move another loaded pallet above the rails on raised forks.

* * * * *